Figure 1:
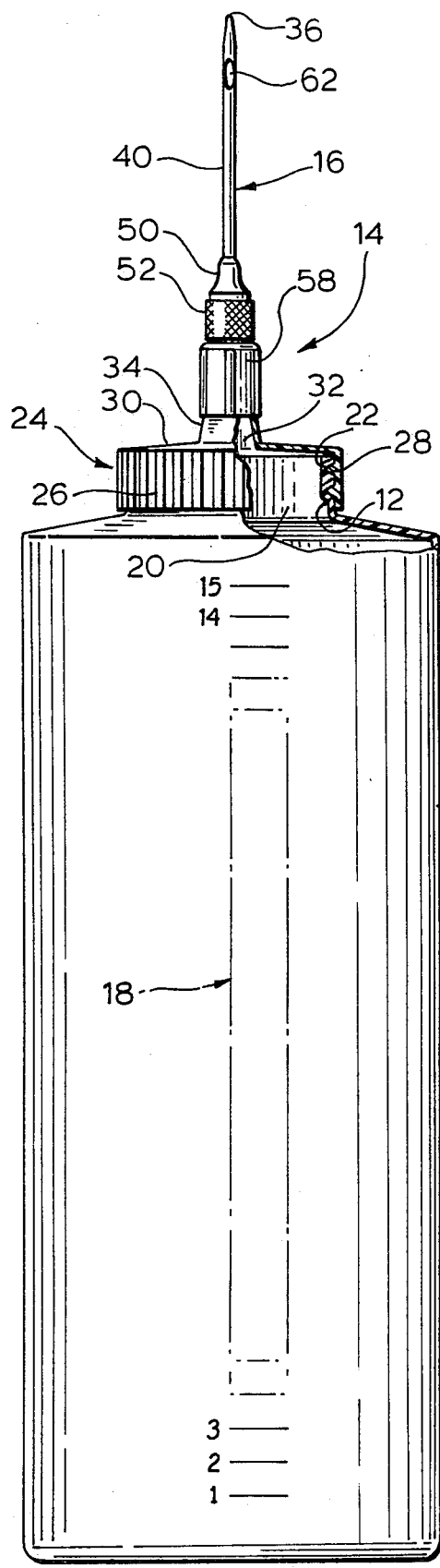

United States Patent [19]

Rumm

[11] 4,049,160

[45] Sept. 20, 1977

[54] FLEXIBLE SQUEEZE DISPENSER FOR LIQUID SEALANT

[76] Inventor: Arnold Rumm, 63 Purdon Drive, Downsview, Ontario, Canada

[21] Appl. No.: 611,578

[22] Filed: Sept. 8, 1975

[51] Int. Cl.² .................. B65D 37/00; B65D 35/38
[52] U.S. Cl. .................. 222/215; 141/330; 222/566; 222/568
[58] Field of Search .............. 222/215, 158, 566–568, 222/575; 141/19, 329, 330

[56] References Cited

U.S. PATENT DOCUMENTS

| 1,667,821 | 5/1928 | Rhodes | 222/566 |
| 2,683,456 | 7/1954 | Pierson | 222/568 X |
| 2,714,805 | 8/1955 | Zellweger | 141/19 X |
| 2,897,826 | 8/1959 | DiVito | 222/158 X |
| 3,109,427 | 11/1963 | Davidson | 222/575 X |

FOREIGN PATENT DOCUMENTS

| 257,572 | 3/1927 | Italy | 222/568 |

*Primary Examiner*—Robert B. Reeves
*Assistant Examiner*—David A. Scherbel
*Attorney, Agent, or Firm*—Rogers, Bereskin & Parr

[57] ABSTRACT

A liquid sealant dispenser for use with inflatable balls is described. The dispenser includes a resilient sealant container having a cap assembly which includes a slender elongate dispensing element. The element projects from the cap and is formed with a laterally-directed dispensing opening which is located adjacent to but spaced from the outer end of the element. The element is inserted through an opening in a ball in use and sealant is delivered into the ball by squeezing the container.

5 Claims, 2 Drawing Figures

FLEXIBLE SQUEEZE DISPENSER FOR LIQUID SEALANT

This invention relates to a liquid sealant dispenser for use with inflatable balls, each including means defining a closable opening through which the ball can be inflated.

A dispenser for this purpose must meet a number of fairly specific requirements if it is to be capable of use with balls of different types. For example, the dispenser must be capable of delivering sealant directly into the interior of the ball. This is particularly important where the ball is fitted with a valve assembly which could become clogged by sealant. Also, the dispenser must not damage the ball or valve assembly (where fitted).

Syringes have previously been used to dispense ball sealant. An example of a syringe used for this purpose is sold under the name "Monoject Disposable" and is intended primarily for use in injecting animals. A problem with this type of dispenser is that, in some areas, it is illegal for a person not medically qualified to use a syringe. Apart from this, conventional syringes have significant disadvantages if used as dispensers for ball sealant.

One disadvantage is that a syringe must be filled with sealant from a separate container each time it is used. Since a syringe cannot be sealed air-tightly, excess sealant must subsequently be emptied back into the container to prevent degeneration of the sealant due to contact with the air. The operation of filling and emptying the syringe is awkward to perform and is time consuming and the syring must be washed out after each use. Also, small size syringes (e.g. 2 oz. capacity) break easily since they are designed for one time use. More robust syringes are available in larger sizes but have the same disadvantages of the small syringes in that they must be filled, emptied and washed out each time they are used. These large syringes are also expensive.

An object of the present invention is to provide an improved liquid sealant dispenser for the purpose specified.

According to the invention the dispenser includes a resiliently deformable container for said sealant, the container having a neck which defines an opening communicating with the interior of the container. A cap assembly is also provided and includes a cap fitted to the neck of the container, the cap and container neck being formed with co-operating means for removably retaining the cap on the container. A slender elongate dispensing element of tubular form projects from the cap and is dimensioned for insertion in said opening in a ball. The dispensing element has an inner end communicating with the interior of the container, and an outer end which is outwardly rounded. The element is also formed with a single, laterally-directed dispensing opening which communicates with the interior of the container and which is positioned closely adjacent to and spaced from the outer end of the element. In use, the dispensing element can be inserted through an opening in a ball to bring the dispensing opening of the element into communication with the interior of the ball, whereupon the container can be deformed to dispense sealant into the ball.

Figure 2:
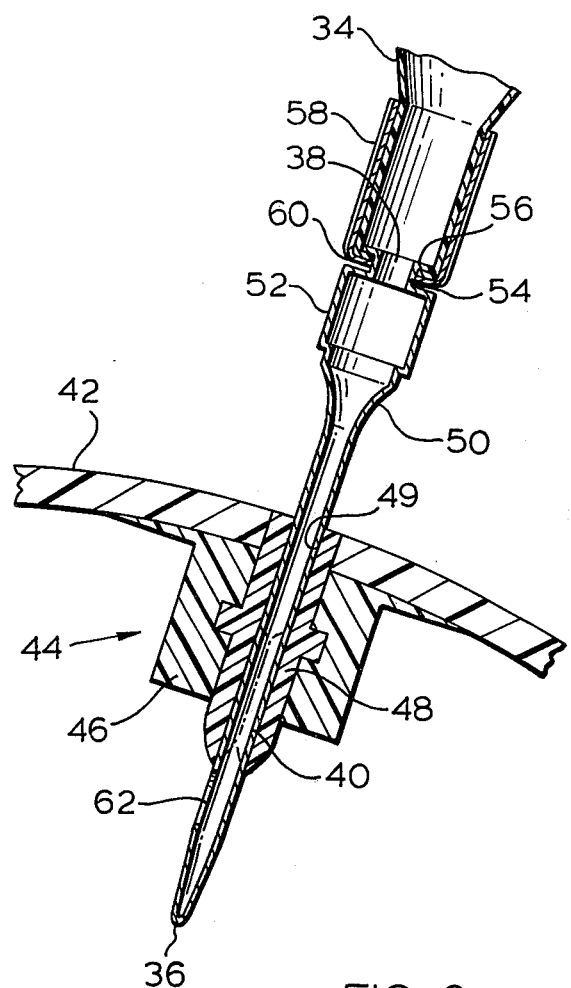

The invention will be better understood by reference to the accompanying drawings which illustrate one embodiment of the invention by way of example, and in which:

FIG. 1 is a side view, partly sectioned, of a dispenser according to the invention; and, FIG. 2 is a sectional view through part of an inflatable ball having a valve assembly and shows the dispenser in position in the assembly for delivering sealant into the ball.

Referring primarily to FIG. 1, the dispenser includes a resiliently deformable plastic bottle 10 of generally cylindrical shape. The bottle has a neck 12 which is fitted with a cap assembly 14 including a slender elongate dispensing element 16.

The bottle 10 is a conventional "squeeze" type of bottle and is made of p.v.c. The bottle contains a liquid ball sealant of the type sold under the trade mark FLAT PROOF distributed by Flat-Proof International of 1238 North Highland Avenue, Los Angeles, U.S.A. The bottle has a capacity of 16 luid ounces. The material from which the bottle is made is translucent so that the fluid level can be seen through the wall of the bottle. A series 18 of graduations is provided on the bottle and serves to indicate the amount of liquid dispensed as will be described.

The bottle neck 12 defines an opening 20 communicating with the interior of the bottle. The external surface of neck 12 is formed with a coarse screw thread 22. The dispensing fitment 14 includes a cap 24 having a depending skirt 26 formed with an internal screw thread 28 which mates with the thread 22 on neck 12. Cap 24 also includes a top wall 30 formed with a central opening 32. Opening 32 communicates with an integral tubular formation 34 which projects upwardly from the top wall 30. Formation 34 tapers slightly towards its upper end. The cap 24 and integral formation 34 are made of the same material as the bottle 10.

Dispensing element 16 projects from the cap 24 generally axially of the container 10. Element 16 has a closed outer end 36 and an open inner end 38 (see FIG. 2) which communicates with the interior of the cap 24 and hence with the interior of bottle 10. The dispensing element is of tubular form and includes an outer end portion 40 dimensioned to be received in the valve assembly of an inflatable ball. In FIG. 2, part of the wall of such a ball is indicated in 42 and a conventional valve assembly fitted in said wall is generally denoted 44.

Assembly 44 includes an outer housing 46 which protrudes into the ball and which is formed with an integral flange attached to the inner surface of wall 42. Housing 44 defines an internal passageway which receives an inner valve member 48. Member 48 is formed with an axial passageway 49 which opens at the outer surface of the ball and which extends along approximately half of the length of the member. The inner end of the passageway communicates with the interior of the ball by way of an axial slit in the member. Normally, the slit is closed preventing leakage of air from the ball. However, the slit can be opened by a suitable device introduced into passageway 49 e.g. for the purpose of inflating the ball. Dispensing element 16 is shown in this position in FIG. 2.

Element 16 is made of metal and includes a conical portion 50 at the inner end of portion 40. The element also includes an externally knurled cylindrical portion 52 adjacent the conical portion 50 and a smaller diameter cylindrical portion 54 at the inner end of the element. Portion 54 is formed with an external flange 56. Flange 56 is located inside the open upper end of the formation 34 on the bottle cap 24. A metal sleeve 58 is crimped onto the upper portion of formation 34 to secure the dispensing element to the cap. The upper end portion 60 of sleeve 58 is turned inwardly to engage above flange 56. The radial compression of formation 34 which takes place when sleeve 58 is crimped on causes the formation to firmly engage against the peripheral edge of flange 56 whereby the dispensing element 16 is firmly coupled to the cap and cannot pivot laterally or move axially with respect to formation 34.

The outer end 36 of portion 40 of element 16 is rounded to provide a smooth surface for contact with the valve member 48 of valve assembly 44. This avoids damaging the member 48. Located adjacent to but spaced from the rounded outer end 36 of element 16 is an opening 62 through which ball sealant may be dispensed from container 10. As can be seen from FIG. 1, opening 62 is of elongate form with rounded ends. The opening 62 is positioned such that when the valve assembly 44 is in the fully open position as shown, the opening 62 is located clear of the valve member 48, whereby ball sealant can flow into the interior of the ball from element 16.

The sealant contained in bottle 10 may be used both to repair punctures in a ball and to seal the inside surface of a ball to guard against the risk of punctures. In any event, the sealant is introduced into the ball by first inserting the outer end 36 of element 16 through the passageway 49 of the valve member 48 to opening the slit in the valve member 48 until the dispensing opening 62 is fully exposed to the interior of the ball as shown in FIG. 2. By squeezing the bottle 10 a predetermined amount of sealant can be dispensed through the neck of the bottle, into the dispensing element 16 and out through opening 62 into the interior of the ball. For normal size balls, one ounce of sealant is sufficient. The dispensing element 16 is then removed from the valve assembly, allowing member 48 to return to its closed position. The ball can now be inflated to recommended air pressure. After inflation, the ball is preferably rotated and bounced at least eight times to distribute the sealant.

The viscosity of the liquid sealant and the dimensions of the dispensing element 16 are such that the sealant will not leak from the bottle through opening 62 if the bottle is accidently inverted or upset when not in use. Although the assembly 14 may be left on the bottle for reasonable periods, it is preferable to remove the cap assembly 14 after each use, wash off excess sealant and fit a plain cap on the container.

Normally, the ball sealant will be shipped in containers such as that indicated at 10. The container will be provided with a screw cap which is removed when the sealant is to be used and is replaced by a cap assembly such as that indicated at 14. When the bottle is empty, the assembly 14 may be removed and fitted to a fresh bottle. Obviously, bottles may be made in varying sizes and will be provided with cap assemblies of corresponding sizes. Irrespective of the size of the cap, the dispensing element 16 will normally be of the same dimensions for a particular type of ball. In any event, the overall length and the diameter of the outer end portion 40 of element 16 is important as in the position of the opening 62. In a particular embodiment being described, the dispensing element is a rounded end Infusion Canulaei Syringe needle in which portion 40 is 4.5 cm in length and is approximately 0.3 cm in diameter. The centre of opening 62 is approximately 1.1 cm from the outer end 36 of portion 40 and the opening is of approximately 0.6 m in length.

A significant advantage of the sealant dispenser shown in the drawings is that it may be used for a wide range of different types of inflatable balls. FIG. 2 of the drawings shows only an example of one type of valve assembly. The dispenser may be used with many other types of valve assembly, or with balls having no valve assembly. This type of ball may have a simple opening which is plugged to seal the ball. Alternatively an external tube may be provided, which can be folded over a plugged to seal the ball. It is also to be understood that the term "ball" also includes bladders and the like.

Another advantage of the dispenser according to the invention is that it avoids the disadvantages mentioned above associated with the use of syringes in that the sealant container does not have to be repeatedly filled and emptied. Also, the dispenser is substantially more robust than a conventional one time syringe.

It will of course be appreciated that the preceding description applies to a specific embodiment of the invention only and that many modifications are possible within the broad scope of the invention.

For example, the bottle 10 may, of course, be made in different shapes. Also, the dispensing element could be a simple hollow rod closed at its outer end and could be fitted directly to the bottle cap 24. The cap and element 16 could be made as a one-piece molding e.g. of a plastic material.

What I claim is:

1. A liquid sealant dispenser for use with inflatable balls, each including means defining a closable opening in the ball, the dispenser comprising:

a resiliently deformable container for said sealant, said container having a neck which defines an opening communicating with the interior of the container; and, a cap assembly comrpising: a cap fitted to the neck of the container, said cap and container neck being formed with co-operating means for removably retaining the cap on the container; a slender elongate dispensing element of tubular form which projects from said cap and which has an inner end portion communicating with the interior of the container, and an outer end which is outwardly rounded, said inner end portion of the dispensing element including an outwardly directed flange, and said cap including an outwardly projecting tubular formation receiving and surrounding said flange; and a sleeve crimped around said formation at the position of said flange and coupling said formation in liquid-tight relationship with said flange; the dispensing element being formed with a single, laterally-directed dispensing opening which communicates with the interior of the container, said opening being of a length not substantially greater than its width and being positioned closely adjacent to but spaced from the outer end of the element so that the portion of the dispensing element between said opening and the cap is of substantial length compared with the overall length of the element and is unapertured, said portion of the element being of constant cross-sectional shape and having a small external diameter in relation to the overall length of the element to allow insertion of the element in said closable opening in a ball;

whereby when the dispensing element is inserted through said opening in a ball, said unapertured portion of the dispensing element extends through the wall of the ball and spaces said dispensing opening of the element substantially inwardly of the ball so that the element communicates only with the interior of the ball, whereupon the container can be deformed to dispense sealant into the ball.

2. A dispenser as claimed in claim 1, wherein said container is in the form of a plastic squeeze bottle of a translucent material and is provided with a longitudinal series of graduations intended to be read in conjunction with the level of liquid in the container, whereby the amount of liquid dispensed can be determined from said graduations.

3. A dispenser as claimed in claim 1, wherein said outer end portion of the dispensing element is of approximately 4.5 cm in length and has a diameter of approximately 0.3 cm, and wherein the centre of the said dispensing opening is approximately 1.1 cm from the outer end of the element and is of approximately 0.6 cm in length.

4. A dispenser cap assembly for use with a resiliently deformable container having a neck which defines an opening communicating with the interior of the container, the container being adapted to contain liquid sealant for inflatable balls, each including means defining a closable opening in the ball;

wherein the cap assembly comprises: a cap adapted to be removably fitted to the neck of the container; a slender elongate dispensing element of tubular form which projects from said cap and which has an inner end portion communicating with the interior of the container, and an outer end which is outwardly rounded, said inner end portion of the dispensing element including an outwardly directed flange, and said cap including an outwardly projecting tubular formation receiving and surrounding said flange; and a sleeve crimped around said formation at the position of said flange and coupling said formation in liquid-tight relationship with said flange; the dispensing element being formed with a single, laterally-directed dispensing opening intended for communication with the interior of the container in use, said opening being of a length not substantially greater than its width and being positioned closely adjacent to but spaced from the outer end of the element so that the portion of the dispensing element between said opening and the cap is of substantial length compared with the overall length of the element and is unapertured, said portion being of constant cross-sectional shape and having a small external diameter relative to the overall length of the dispensing element, to allow insertion of the element into said opening in a ball;

whereby when the dispensing element is inserted through an opening in a ball with the cap assembly in use on a container, said unapertured portion of the dispensing element extends through the wall of the ball to space said dispensing opening of the element substantially inwardly of the ball so that the opening communicates only with the interior of the ball, whereupon the container can be deformed to dispense sealant into the ball.

5. For use with a cap assembly as claimed in claim 4, a resiliently deformable container for a liquid sealant, wherein the container has a neck which defines an opening communicating with the interior of the container and which is adapted to be coupled to said cap assembly, and wherein the container is in the form of a plastic squeeze bottle of a translucent material and is provided with longitudinal series of graduations intended to be read in conjunction with the level of liquid in the container, whereby the amount of liquid dispensed can be determined from said graduations.

* * * * *